United States Patent [19]

Oishi et al.

[11] Patent Number: 5,069,981
[45] Date of Patent: Dec. 3, 1991

[54] STEEL SHEET DIP-PLATED WITH A ZN-AL ALLOY AND PROCESS FOR THE MANUFACTURE THEREOF

[75] Inventors: Hiroshi Oishi; Akira Maruyama, both of Wakayama, Japan

[73] Assignee: Sumitomo Metal Industries, Ltd., Osaka, Japan

[21] Appl. No.: 376,007

[22] Filed: Jul. 6, 1989

[30] Foreign Application Priority Data

Jul. 7, 1988 [JP] Japan .................... 63-169550
May 2, 1989 [JP] Japan .................... 1-113158

[51] Int. Cl.$^5$ ............................................ B32B 15/00
[52] U.S. Cl. .................... 428/659; 148/337; 428/939
[58] Field of Search ............ 428/659, 939; 148/330, 148/337; 420/121, 126, 127

[56] References Cited

U.S. PATENT DOCUMENTS

| | | | |
|---|---|---|---|
| Re. 31,221 | 4/1983 | Elias et al. | 148/337 |
| 4,448,748 | 5/1984 | Radtke et al. | 428/659 |
| 4,610,936 | 9/1986 | Isobe et al. | 428/659 |
| 4,812,371 | 3/1989 | Shindou et al. | 428/659 |

OTHER PUBLICATIONS

Galfan Galvanizing Alloy & Technology, by D. C. Herrschaft, J. Pelerin, B. Bramaud, First Edition Oct. 1981.

*Primary Examiner*—R. Dean
*Assistant Examiner*—Robert R. Koehler
*Attorney, Agent, or Firm*—Burns, Doane, Swecker & Mathis

[57] ABSTRACT

A low carbon steel sheet dip-plated with a Zn-Al alloy, which is in a non-recrystallized and rolled state and which comprises, as an element to raise the recrystallization temperature, at least one of Ti: 0.01~0.40% by weight, Nb: 0.01~0.10% by weight, and B: 0.001~0.010% by weight, and a process for the manufacture thereof which comprises carrying out dip-plating at a temperature lower than the recrystallization temperature.

7 Claims, 1 Drawing Sheet

STEEL SHEET DIP-PLATED WITH A ZN-AL ALLOY AND PROCESS FOR THE MANUFACTURE THEREOF

BACKGROUND OF THE INVENTION

The present invention relates to a non-recrystallized steel sheet which is dip-plated with a Zn-Al alloy and a process for manufacturing the steel sheet. According to the present invention, the dip-plating is carried out at a temperature lower than the recrystallization temperature of the steel sheet without leaving an unplated area so that the plated steel sheet is free of surface defects caused by the presence of an unplated area and possesses a tensile strength of 50 kgf/mm² or higher.

Dip-plated steel sheet which uses a molten Zn-Al alloy bath suffers from poor wetting between the plating layer and the steel substrate. Therefore, an alloying reaction of the molten metal with the substrate does not occur on the portions of the surface of the steel substrate where reduction has not been carried out thoroughly during the pretreatment of the steel sheet, usually resulting in surface defects where the substrate is unplated and exposed.

In order to avoid these surface defects, in the prior art, La, Ce, and the like are added to the molten metal bath. However, it is difficult to completely avoid the formation of unplated areas.

In the case of high-strength steel sheet such as ASTM Specification Grade E which possesses a tensile strength of 50 kgf/mm² or higher, dip-plating with a molten metal should be performed at a temperature lower than the recrystallization temperature (usually 50° C. or lower) in order to avoid softening of the steel. This processing temperature is rather low in comparison with that for genera-purpose steel sheet which is normally pretreated at 680° C. or higher. Thus, general-purpose steel sheet is annealed for recrystallization during processing.

When high-strength steel sheet is subjected to pretreatment for dip-plating at a temperature lower than its recrystallization temperature, the reduction of the surface of the steel substrate in the heating zone does not occur thoroughly, and the steel sheet just before going into the dip-plating bath has areas of insufficient reduction. This frequently results in the formation of unplated areas, especially in the case of Zn-Al alloy molten metal plating.

Japanese Kokai 59-190332 discloses a method of carrying out dip-plating of a low carbon steel strip using a molten zinc bath after annealing the steel strip at 780~820° C. higher than the recrystallization temperature. The low carbon steel contains B together with Ti and Nb so as to improve formability. The tensile strength of the steel is less than 50 kgf/mm².

Japanese Kokai 61-60872 discloses a method of carrying out dip-plating of a low carbon steel strip with a Zn-Al alloy. However, in this case, too, recrystallization essentially takes places at an annealing temperature of 780° C. The steel contains 0.025~0.12% of Ti together with 0.004% or more of N so as to form TiN which is effective to increase the occlusion of hydrogen of the steel.

SUMMARY OF THE INVENTION

The object of the present invention is to provide a low carbon steel sheet dip-plated with a Zn-Al alloy in a non recrystallized state possessing a tensile strength of 50 kgf/mm² or higher and a process for producing the same while carrying out the pretreatment and dip-plating of the steel sheet at a temperature lower than the recrystallization temperature for the steel sheet, the resulting steel sheet being free of surface defects caused by unplated areas.

The inventors of the present invention found that the addition of at least one of Ti, Nb, and B is effective to markedly raise the recrystallization temperature of low carbon steels.

Thus, a low carbon steel sheet dip-plated with a molten Zn-Al alloy of the present invention comprises C:0.07% by weight or less, and at east one of Ti:0.01~0.40% by weight. Nb:0.01~0.10% by weight, and B:0.001~0.010% by weight. The steel sheet further comprises a dip-plated Zn-Al alloy layer containing 3~8% by weight of Al on the steel sheet substrate in a non-recrystallized and rolled state.

According to one aspect of the present invention, the above-described steel sheet is subjected to a continuous annealing treatment at a temperature of 600° C. or higher but not higher than the recrystallization temperature of the steel substrate, and the pretreated steel sheet is dip-plated with a molten Zn-Al alloy containing 3~8% by weight of Al.

The term "non-recrystallization" is herein employed to describe the state of a steel sheet which is annealed at a temperature of not higher than the recrystallization temperature so as to avoid a decrease in mechanical strength which usually occurs during annealing for a cold-rolled steel sheet. Under usual conditions, the recrystallization temperature is generally 550~680° C. for low carbon steel strips of the category to which the present invention pertains. In this respect, it is possible to raise the recrystallization temperature to 650% or higher, preferably 700% or higher according to the present invention.

The present invention is not limited to a specific steel composition, and the steel substrate of the present invention may comprise:
C:not higher than 0.07%,
Si:not higher than 0.01%,
Mn:0.1~0.6%.
sol.Al: not higher than 0.03%,
N:not higher than 0.01%, and
S:not higher than 0.02%. at least one of Ti:0.01~0.40% by weight, Nb:0.01~0.10% by weight, and B:0.001~0.010% by weight.

DESCRIPTION OF THE PREFERRED EMBODIMENTS

The reasons for the above-described limitations on the chemical composition of the dip-plated steel sheet of the present invention will now be described in detail.

Ti (titanium) increases the recrystallization temperature when it is added in an amount of at least 0.01% by weight. However, when Ti is added in an amount of greater than 0.40% by weight, an increase in manufacturing costs is inevitable. Thus, the content of Ti is desirably 0.01~0.40% by weight. The excess amount of Ti, which is defined by the equation $$(Ti - C \times 48/12 - N \times 48/14 - S \times 48/32$$

is preferably limited to within the range of from −0.02 to 0.30.

When either Nb or B is added in an amount of 0.01% by weight or more or 0.001% by weight or more, respectively, the recrystallization temperature is also raised. On the other hand, when either of them is added in an amount in excess o 0.10% by weight or 0.010% by weight, respectively, manufacturing costs increase with no significant increase in the recrystallization temperature. Thus, the contents of Nb or B are defined as 0.01~0.10% by weight, or 0.001~0.010% by weight respectively.

Although it is within the scope of the present invention to add a singe one of Ti, Nb, and B, it is also within the scope of the present invention to add two or more of these elements. Preferably, only Ti is added with the excess Ti being in the range of −0.02 to 0.30.

According to the present invention, dip-plating may be carried out in conventional manners. In a preferred embodiment, the bath temperature is restricted to 420~500° C., and the Al content of the molten metal bath is limited to 3~8% by weight in view of the corrosion resistance of the plated layer.

When the pretreatment temperature, i.e., the annealing temperature is lower than 600%, there is inevitably much formation of unplated areas. On the other hand, if the temperature is higher than the recrystallization temperature of the steel sheet, the metallurgical structure of the steel sheet becomes a recrystallized structure, resulting in a degradation in tensile strength. Therefore, according to the present invention the pretreatment temperature, i.e., the annealing temperature is restricted to not lower than 600° C., but not higher than the recrystallization temperature.

Thus, according to the present invention by the addition of at least one of Ti, Nb, and B it is possible to raise the recrystallization temperature to a eve higher than that of usual low carbon steel so that it is possible to carry out dip-plating at a higher temperature than the temperature at which unplated areas are usually formed. The resulting dip-plated steel sheet has a high tensile strength of not lower than 50 kgf/mm$^2$, is in a non-recrystallized state, and is free of unplated areas.

The present invention will now be described in further detail with reference to the following working examples which are presented merely for the illustrative purposes.

EXAMPLE 1

Figure 1:
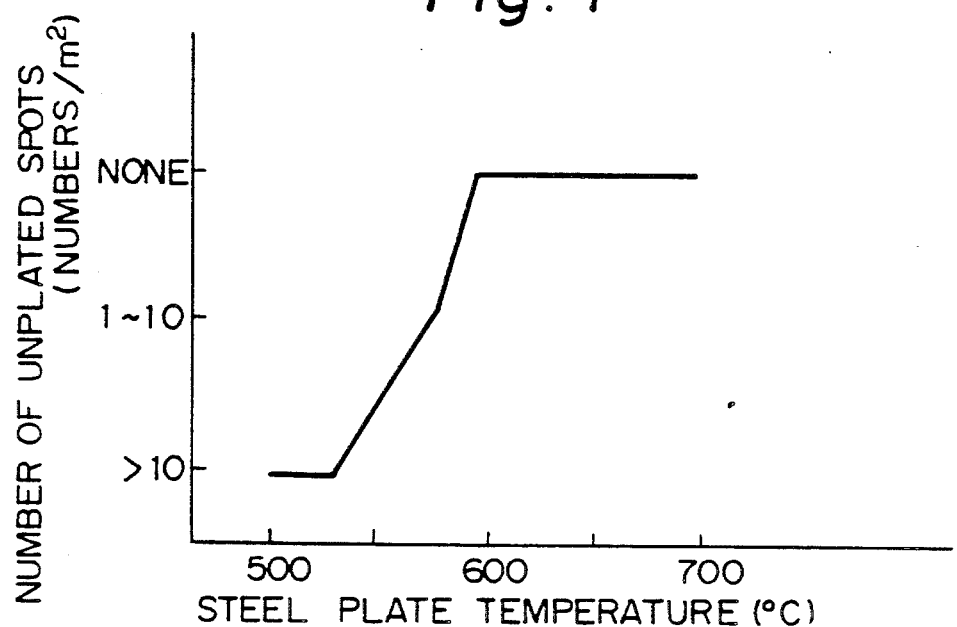
FIG. 1 is a graph showing the relationship between the annealing temperature and the occurrence of unplated areas during dip-plating for a steel sheet which is subjected to continuous annealing just before dip-plating.

In this example, usual low carbon steel sheet (C:0.012%, Si:0.01%, Mn:0.23%, Ti:0.068%) which had been pretreated by annealing was dip-plated under the conditions shown in Table 1 to determine the relationship between the occurrence of unplated areas and the pretreatment temperature. The occurrence of unplated areas was determined by the number of unplated spots appearing on the surface of the dip-plated steel sheet. The results are graphically shown in FIG. 1.

It can be seen from the results that it is necessary to use a steel sheet which has been pretreated, i.e. annealed at a temperature of 600° C. or higher in order to eliminate the occurrence of unplated areas.

TABLE 1

| | |
|---|---|
| Dimensions | 0.6 × 914 mm |
| Bath Composition | 4.5% Al—Zn |
| Bath Temperature | 430° C. |
| Air/fuel Ratio for the non-oxidizing furnace | 0.95 |
| Atmosphere in the heating zone | 20% H$_2$—N$_2$ |
| Temperature of Sheet before dipping | 520° C. |
| Line Speed | 60 m/min |

EXAMPLE 2

In this example, low carbon steel sheets having the compositions shown in Table 2 with the addition of at east one of Ti, Nb, and B were used o determine the relationship between the content of Ti, Nb, and B and the recrystallization temperature. The results are graphically shown in FIG. 2.

TABLE 2

| Steel | C | Si | Mn | sol. Al | N | S |
|---|---|---|---|---|---|---|
| A | 0.005 | 0.01 | 0.12 | 0.03 | 0.002 | 0.009 |
| B | 0.007 | 0.02 | 0.18 | 0.03 | 0.002 | 0.011 |

Figure 2:
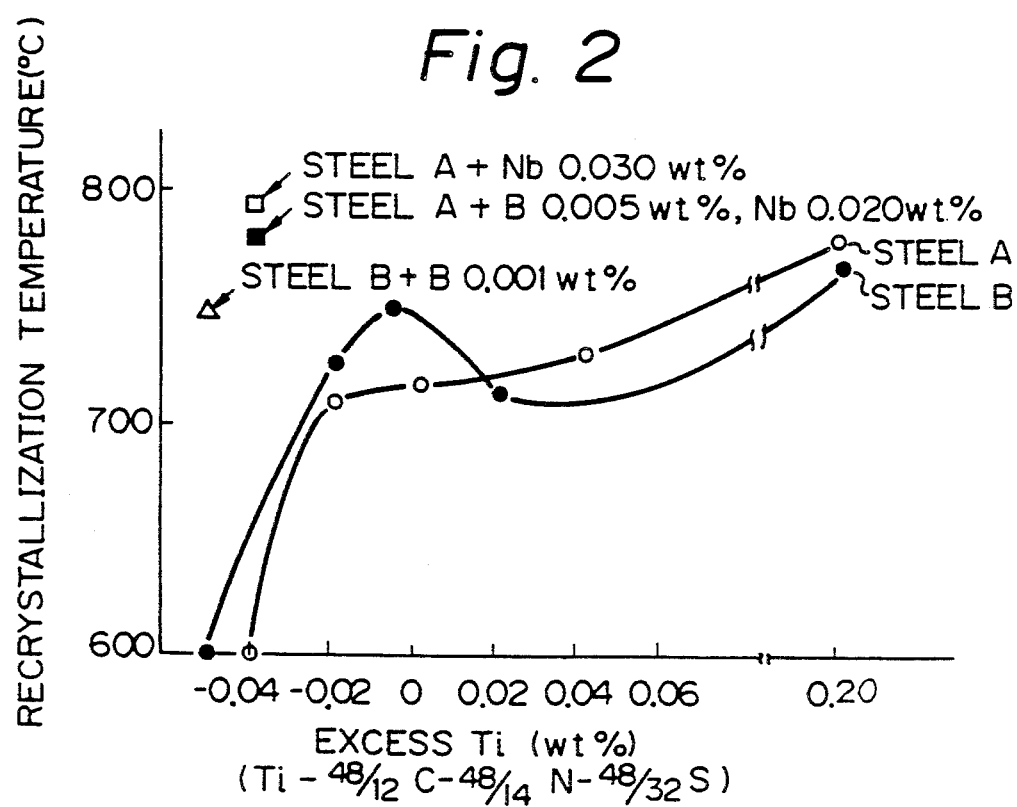
FIG. 2 is a graph showing the relationship between the recrystallization temperature and the excess amount of Ti, and the content of Nb and B.

In FIG. 2, the recrystallization temperature is plotted as a function of the excess amount of Ti given by the formula $$[(Ti - (C \times 48/12 + N \times 48/14 + S \times 48/32)].$$

In FIG. 2, the symbol ○ is used for Steel A, and the symbol ● is for Steel B.

In addition, the symbol □ indicates the recrystallization temperature of a steel corresponding to Steel A that further contains 0.030% by weight of Nb. The symbol ■ indicates the recrystallization temperature of a steel corresponding to Steel A that further contains 0.005% by weight of B and 0.020% by weight of Nb. The symbol Δ indicates the recrystallization temperature of a steel corresponding to Steel B that further contains 0.001% by weight of B.

Titanium contained in a cold-rolled steel sheet forms compounds such as TiC, TiN, and TiS before being subjected to annealing. Since it has been thought that the lower the carbon content in said solution the higher the recrystallization temperature, he recrystallization temperature rises markedly when a certain amount of Ti is added such that a very small amount of Ti which does not combine with C, N, and S remains free. Of course when either Nb or B is added, the recrystallization temperature rises.

In any case, a steel which contains at east one of Ti, Nb, and B has a recrystallization temperature 100° C. higher than that of usual low carbon steel.

Thus, according to the present invention, by applying an annealing treatment at a temperature of 600~700° C., preferably 600~680° C. to a low carbon steel sheet which includes at least one of Ti, Nb, and B to effect a sufficient level of reduction on the surface of the sheet, it is possible to obtain a steel sheet dip-plated with a Zn-Al alloy in a non-recrystallized state.

EXAMPLE 3

Steel strips Nos. 1~16 measuring 0.6 mm thick and 914 mm wide having the chemical compositions shown in Table 3 (the excess Ti is within the range of −0.02~0.30) were subjected to annealing at the temperatures shown in Table 3. After this pretreatment, dip-plating was carried out using a Zn-Al molten metal plating bath at a bath temperature of 430° C. using a line speed of 60 m/min and a strip temperature of 520° C.

The resulting dip-pated steel strips were evaluated with respect to the properties of the plating and their tensile strength after dip plating. The test results are summarized in Table 3. For the purpose of comparison, comparative data are also shown for a low carbon steel strip which was annealed under usual conditions and for another low carbon steel strip which was annealed at a temperature lower than its recrystallization temperature.

As is apparent from Table 3, the steel strip obtained in accordance with the present invention was completely free from unplated areas in spite of the fact that the annealing was carried out at a temperature lower than the annealing temperature of the usual steel. In addition, the tensile strength of the resulting steel strips was 50 kgf/mm² or higher, and their metallurgical structure were non-recrystallized forms.

In contrast, the comparative steel strip did not suffer from the unplated areas when the strip was annealed at a temperature higher than the usual annealing temperature, but the metallurgical structure thereof was changed into a recrystallized structure, and it had a tensile strength on the order of 30 kgf/mm². Thus, the comparative steel strip could not be called high strength steel. On the other hand, when the annealing was carried out at a low temperature of 600° C. the tensile strength of the resulting dip-plated steel strip was 50 kgf/mm, or higher, but there was formation of unplated areas. Thus, the comparative steel strip did not meet all the requirements for high strength Zn Al dip-plated steel sheet.

What is claimed is:

1. A low carbon steel sheet dip-plated with a Zn-Al alloy, which comprises a steel substrate comprising C:0.07% by weight or less, and at least one of Ti:0.01—0.4% by weight, and B:0.001—0.010% by weight and a dip plating comprising a Zn-Al alloy layer containing 3-8% by weight of Al, the steel sheet substrate being in a non-recrystallized and rolled state.

2. A low carbon steel sheet dip-plated with a Zn-Al alloy as set forth in claim 1, wherein Ti is added in an amount of 0.01~0.40% by weight, and the excess amount of Ti defined by the equation (Ti—C×48/12—N×48/14—S×48/32 is restricted to —0.02~0.30%.

3. A low carbon steel sheet dip-plated with a Zn-Al alloy as set forth in claim 1, wherein the low carbon steel comprises:
C:not higher than 0.07%,
Si:not higher than 0.01%,
Mn:0.1–0.6%,
sol.Al:not higher than 0.03%,
N:not higher than 0.01%,
S:not higher than 0.02%, and
at least one of Ti:0.01–0.04% by weight, and B:0.001–0.010% by weight.

4. A low carbon steel sheet dip-plated with a Zn-Al alloy as set forth in claim 1, wherein the recrystallization temperature of the steel substrate is 650° C. or higher.

5. A low carbon steel sheet dip-plated with Zn-Al alloy as set forth in claim 1, wherein said steel substrate comprises 0.01–0.40% by weight Ti.

6. A low carbon steel sheet dip-plated with a Zn-Al alloy as set forth in claim 1, wherein said steel substrate comprises 0.001–0.010% by weight B.

7. A low carbon steel sheet dip-plated with a Zn-Al alloy as set forth in claim 1, wherein said steel substrate comprises 0.01–0.40% by weight Ti and 0.001–0.010% by weight B.

TABLE 3

| | | Chemical Composition (wt %) | | | | | | | | Recrystallization Temp. (°C.) | Annealing Temp. (°C.) | Non-Plating | Tensile Strength (kgf/mm²) | Zn—Al Plating | |
|---|---|---|---|---|---|---|---|---|---|---|---|---|---|---|---|
| | | C | Si | Mn | sol. Al | N | S | Ti | Nb | B | | | | | Al (wt %) | Deposition (g/m²) |
| This Invention | 1 | 0.005 | 0.01 | 0.12 | 0.030 | 0.002 | 0.009 | 0.012 | — | — | 650 | 600 | ○ | 57 | 4.6 | 128 |
| | 2 | 0.005 | 0.01 | 0.25 | 0.030 | 0.002 | 0.009 | 0.041 | — | — | 700 | 640 | ○ | 60 | 4.5 | 131 |
| | 3 | 0.003 | 0.01 | 0.20 | 0.031 | 0.003 | 0.012 | 1.080 | — | — | 780 | 690 | ○ | 61 | 4.7 | 131 |
| | 4 | 0.003 | 0.01 | 0.21 | 0.028 | 0.002 | 0.010 | 0.240 | — | — | 750 | 690 | ○ | 60 | 4.7 | 130 |
| | 5 | 0.003 | 0.01 | 0.22 | 0.030 | 0.002 | 0.012 | 0.390 | — | — | 750 | 690 | ○ | 59 | 4.7 | 135 |
| | 6 | 0.004 | 0.01 | 0.25 | 0.029 | 0.002 | 0.010 | — | — | 0.001 | 720 | 700 | ○ | 60 | 5.2 | 129 |
| | 7 | 0.005 | 0.01 | 0.25 | 0.030 | 0.002 | 0.009 | — | — | 0.010 | 750 | 700 | ○ | 62 | 5.0 | 130 |
| | 8 | 0.005 | 0.01 | 0.23 | 0.030 | 0.002 | 0.009 | — | 0.012 | — | 750 | 700 | ○ | 59 | 5.0 | 126 |
| | 9 | 0.005 | 0.01 | 0.24 | 0.030 | 0.002 | 0.009 | — | 0.095 | — | 780 | 700 | ○ | 60 | 5.0 | 128 |
| | 10 | 0.020 | 0.01 | 0.20 | 0.030 | 0.003 | 0.010 | 0.10 | — | — | 720 | 700 | ○ | 61 | 8.0 | 128 |
| | 11 | 0.050 | 0.01 | 0.18 | 0.028 | 0.003 | 0.010 | 0.16 | — | — | 720 | 700 | ○ | 63 | 7.9 | 127 |
| | 12 | 0.004 | 0.01 | 0.20 | 0.028 | 0.003 | 0.010 | 0.030 | 0.020 | — | 750 | 700 | ○ | 60 | 5.0 | 125 |
| | 13 | 0.004 | 0.01 | 0.21 | 0.028 | 0.003 | 0.011 | 0.040 | — | 0.002 | 750 | 700 | ○ | 62 | 4.7 | 126 |
| | 14 | 0.003 | 0.01 | 0.20 | 0.030 | 0.002 | 0.012 | — | 0.030 | 0.004 | 750 | 700 | ○ | 59 | 4.7 | 125 |
| | 15 | 0.070 | 0.01 | 0.20 | 0.020 | 0.003 | 0.010 | 0.030 | 0.015 | 0.0010 | 750 | 700 | ○ | 62 | 4.7 | 124 |
| | 16 | 0.005 | 0.01 | 0.20 | 0.020 | 0.003 | 0.012 | 0.150 | 0.030 | 0.0070 | 780 | 700 | ○ | 60 | 4.7 | 124 |
| Comparative | 17 | 0.04 | 0.01 | 0.21 | 0.025 | 0.002 | 0.010 | — | — | — | 580 | 640 | ○ | 37 | 5.0 | 128 |
| | 18 | 0.04 | 0.01 | 0.21 | 0.025 | 0.002 | 0.010 | — | — | — | 580 | 540 | x | 59 | 4.9 | 127 |
| | 19 | 0.007 | 0.01 | 0.15 | 0.025 | 0.002 | 0.010 | — | — | — | 580 | 600 | ○ | 35 | 4.9 | 126 |